(12) United States Patent
Port et al.

(10) Patent No.: US 6,245,428 B1
(45) Date of Patent: Jun. 12, 2001

(54) LOW REFLECTIVE FILMS

(75) Inventors: Anthony Brian Port, Leicestershire; Elizabeth Jean Packer, Coventry; Aravinda Parnandi, Nuneaton; Richard J. Ward, Coventry, all of (GB); Steven Allen Barth, Martinsville, VA (US); James P. Enniss, Martinsville, VA (US); Simon John Porter, Martinsville, VA (US)

(73) Assignee: CPFilms Inc., Fieldale, VA (US)

( * ) Notice: Subject to any disclaimer, the term of this patent is extended or adjusted under 35 U.S.C. 154(b) by 0 days.

(21) Appl. No.: 09/095,010

(22) Filed: Jun. 10, 1998

(51) Int. Cl.$^7$ ..................................................... B32B 27/00
(52) U.S. Cl. ......................... 428/421; 428/447; 428/448; 428/480; 428/688
(58) Field of Search ..................................... 428/323, 206, 428/325, 402, 458, 688, 421, 480, 447, 448

(56) References Cited

U.S. PATENT DOCUMENTS

| | | |
|---|---|---|
| 3,429,846 | 2/1969 | Bechtold et al. . |
| 3,833,363 | 9/1974 | Bomberger, Jr. et al. . |
| 3,925,081 | 12/1975 | Chiklis . |
| 4,046,457 | 9/1977 | Land et al. . |
| 4,557,980 * | 12/1985 | Hodnett, III ........................ 428/336 |
| 4,687,707 | 8/1987 | Matsuo et al. . |
| 4,715,999 | 12/1987 | Dislich et al. . |
| 4,765,729 * | 8/1988 | Taniguchi ............................ 351/163 |
| 4,769,306 | 9/1988 | Oberhauser et al. . |
| 5,104,692 | 4/1992 | Belmares et al. . |
| 5,109,080 | 4/1992 | Wang et al. . |
| 5,143,988 | 9/1992 | Wang et al. . |
| 5,268,196 * | 12/1993 | Boulos et al. ........................ 427/165 |
| 5,283,008 | 2/1994 | Coltran et al. . |
| 5,392,156 | 2/1995 | Kumagai et al. ..................... 359/586 |
| 5,449,558 | 9/1995 | Hasegawa et al. . |
| 5,476,717 | 12/1995 | Floch . |
| 5,919,555 * | 7/1999 | Yasuda et al. ........................ 428/206 |
| 6,040,053 * | 3/2000 | Scholz et al. ........................ 428/412 |

FOREIGN PATENT DOCUMENTS

| | | |
|---|---|---|
| 0 166 363 | 1/1986 | (EP) . |
| 0 278 060 | 8/1988 | (EP) . |
| 0 656 258 | 6/1995 | (EP) . |
| 0 749 021 | 12/1996 | (EP) . |

* cited by examiner

Primary Examiner—Bruce H. Hess
Assistant Examiner—B. Shewareged
(74) Attorney, Agent, or Firm—Nixon & Vanderhye P.C.

(57) ABSTRACT

An anti-reflecting film is made from a polymeric film substrate consisting of cellulose acetate, polyamide or polyester. The substrate is coated with at least two polymeric layers. An outer layer is comprised of a fluorine containing polymer. Between the outer layer and the substrate, is an intermediate layer of an organometallic polymeric layer. The organometallic polymeric layer is comprised of the condensation product of a metal alkoxide and a polymer reactive with the metal oxide.

19 Claims, 1 Drawing Sheet

LOW REFLECTIVE FILMS

BACKGROUND OF THE INVENTION

1. Field of the Invention

This invention relates to low reflective transparent polyermic film.

2. Discussion of Prior Art

The transparency of windows, show cases, glass, viewers or video screens can be effected by glass, reflective light sources, or the reflection of surrounding scenery. In order to ameliorate the problem with glare and reflections, anti-reflective coatings have been developed which are typically applied to a surface by vapour deposition or sputtering methods.

Another method for depositing anti reflective coatings is disclosed in U.S. Pat. No. 4,687,707 in which the coating is formed from a thin layer of a reaction product containing a metal oxide e.g. $SiO_2$ or $TiO_2$. Such a product results from the condensation of titanium tetra-alkoxides, titanium chelates or tetraalkoxy silanes. To this layer, is added a second layer of a condensation product containing a fluorine compound such as fluorine containing silane compounds. This multi layer construction bringing about an improvement in the reduction of reflectance.

U.S. Pat. No. 4,966,812 discloses the deposition of a low refractive index anti-reflective coating on plastics material using sol-gel techniques. U.S. Pat. No. 5,109,080 discloses a high refractive index ceramic/polymer material which is made from a sol-gel synthesis of a metal alkoxide with an alkoxysilane-capped poly(arylene ether) polymeric component.

EP 0166363 discloses the use of at least two thin layers as a low reflective coating, a first layer containing metal oxide and having a refractive index in the range of 1.65–2.10, and a second over layer comprising a fluorine-containing silicon compound making a low refractive index having a refractive index of about 1.4.

SUMMARY OF THE INVENTION

The present invention provides a transparent polymeric film having an anti-reflective coating, the coating being a novel coating.

According to the invention there is provided an anti-reflective film comprising a transparent polymeric film substrate coated with at least two polymeric layers, the two layers being an exposed outer polymeric layer comprising a fluorine containing polymer and an inner organometallic reflective layer adjacent the exposed layer and comprising the condensation product of a metal alkoxide and a polymer reactive with the metal alkoxide.

Preferably the inner organometallic polymeric layer has a refractive index of at least 1.6, more preferably 1.7 and the outer layer has a refractive index not greater than 1.45, and preferably not greater than 1.4.

Additional optically active layers of a desired refractive index may be coated onto the film substrate between said substrate and said inner layer and said additional layer or layers may be the same as the inner and outer layers, or different as is required.

Also according to the invention there is provided an anti-reflective film comprising a transparent polymeric film substrate, an exposed outer polymeric layer comprising fluorine containing polymers having a refractive index not greater than 1.45 and a thickness in the order of ¼ wavelength, and an inner polymeric layer adjacent the exposed outer layer containing metal oxide and having a refractive index of at least about 1.6 and a thickness of about ¼ wavelength.

The polymeric film may comprise at least one of cellulose acetate, polyamide, acrylic, polyester, and polycarbonate films.

For the purpose of the present invention the wave length of light is taken as substantially the middle of the visible range that is about 550 nm in air, and the wave length in a particular layer is related to the refractive index of the material of that layer by the formula=

$$\lambda \text{ mat} = \frac{\lambda \text{ air}}{\eta \text{ material}}$$

where $\lambda$=wavelength and $\eta$=refraction index

Preferably the inner polyermic layer comprises the reaction production of a titanium alkoxide, preferably titanium isopropoxide, and a silane containing polymer which can undergo the sol-gel reaction. Suitable polymers are α ω dihydroxypolysiloxanes poly(methyl phenyl siloxane), poly (dimethylsiloxane), and silane modified polyesters.

Preferably the second layer is a fluorine containing polymer which is crosslinkable, preferably using one of the known curing techniques for example ultra violet light, thermal cure, electron beam, free radical and cationic initiation. Preferably the fluorine containing polymer is an acrylate, conveniently an acrylate modified perfluoropolyether. Alternatively the fluorine containing polymer may be a vinyl ether which is crosslinked by a cationic initiator.

The invention also provides a method of manufacture of an anti reflective film in which method fine particles of metal oxide are dispersed in a liquid polymeric material, and the liquid polymeric material is coated onto a polymeric film substrate and cured to give a transparent inner polymeric layer having a refractive index of at least about 1.60 and a thickness of about ¼ wavelength, and the inner polymeric layer is overcoated by an outer polymeric layer of fluorine containing polymer which is cured to give an exposed outer polymeric layer having a refractive index no greater than 1.45 and a thickness of substantially ¼ wavelength.

The invention also provides a further method of manufacture of an anti-reflective film in which method a reaction mixture of a metal alkoxide and a silane modified polymer is coated onto a transparent film substrate and cured to form an inner polymeric layer, and a second layer of a fluorine containing polymer is coated over the inner layer, and is cured to form an exposed outer polymeric layer.

The outer layer can be coated onto the inner layer by either vacuum deposition, or by overcoating the inner layer with a solution of the fluorine containing polymer, followed by removal of the solvent.

Preferably the first layer is a reaction mixture of a metal alkoxide and a silane modified polyester, and the mixture is cured at 180° C. for at least one minute to form said inner layer, and the outer layer is a fluorine containing polymer which is coated over the inner layer directly in contact therewith. Preferably the outer layer is curable on exposure to ultra violet light.

Preferably the metal alkoxide is a titanium or zirconium alkoxide.

Preferably up to 10% by weight of a silane coupling agent, preferably a carbodiimide functional silane, is added as a crosslinking agent to the sol-gel reaction mixture, more preferably about 4% carbodiimide.

Alternatively the inner polymeric layer may be formed from polymerisable monomers such as acrylates, methacrylates, vinyl ether, epoxies, or other monomers containing unsaturated bonds, or from a mixture of polymerisable monomers preferably a triacrylate, or a tetraacrylate and acrylic acid and photo initiators into which fine metal mineral powder is dispersed. Preferably the mineral powder is a colour imparting powder such as a metal oxide, and the particles are sufficiently small that the layer is transparent. Preferably the metal oxide is an iron oxide, preferably haematite which has been ground to a particle size having an average equivalent diameter of less than 100 nm ($100\times10^{-9}$m) and preferably less than 50 nm ($50\times10^{-9}$m).

The invention also relates to a method of making a multi layer anti reflective polymeric film comprising a polymer film substrate and having as one of its layers a layer comprising particles of metal oxide, preferably iron oxide, dispersed in a curable polymeric resin, the particles having an average equivalent diameter of less than $100\times10^{-9}$m. The presence of the metal oxide powder especially coloured powder, such as iron oxide, colours the polymer film layer which absorbs some light and thereby reduces reflection to given an improved anti-reflectance.

If it is desired to reduce the coloration due to the pigment a dye may be added to the film substrate or other layer to produce an overall neutral colour e.g. grey by the addition of blue and red dyes to the polyester substrate.

The refractive index may be varied by varying the content of iron oxide present in the polymeric coating. The iron oxide may comprise up to 85% by weight of the coating by preferably comprises 25–70% by weight of the coating and more preferably 40–55% by weight.

Also, according to the invention there is provided a further method of making a multi-layer anti-reflective film in which a polymeric film substrate is coated with a transparent polymer layer containing inorganic powdered material dispersed within the layer, the powder particles have a high refractive index of greater than 2.6, the film having a haze value of less than 20%.

The haze value will be dependent upon several features including particle size. Preferably the particle size does not exceed 50 nm.

The film haze is measured in accordance with ASTMS D1003-61 using a HazeGard Plus hazemeter catalogue number 4725 available from BYK Gardner Inc. of Silver Spring, Md.

Preferably the haze value does not exceed 5%, and more preferably does not exceed 3%.

Also, according to yet another aspect of the invention there is provided a further method of making an anti-reflective film in which a polymeric film substrate is coated with at least one transparent polymer layer containing inorganic powdered material dispersed within the layer and forming a coloured film, having a refractive index of at least 1.6.

Preferably the inorganic powders are coloured powders particularly metal compounds.

Suitable inorganic powders include the following:
Lead oxide
Ferric oxide
Lead Sulphide
Calcium Sulphide
Mercury Sulphide
Silicon
Silicon Carbide
Germanium
Boron
Selenium

BRIEF DESCRIPTION OF THE DRAWINGS

The present invention will be described by way of example and with reference to the accompanying drawings in which.

DETAILED DISCUSSION OF PREFERRED EMBODIMENTS

Figure 1:
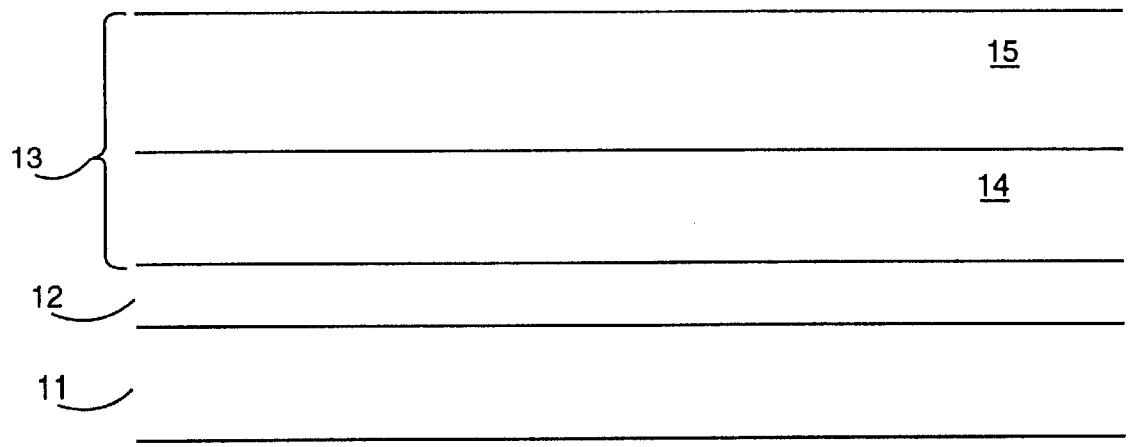
FIG. 1 is a schematic cross-sectional drawing of a film laminate according to the present invention.

With reference to FIG. 1 there is shown a transparent polymeric film 11 of the type sold for adhering to the window glass of building, automobiles, display cases, screens etc. The preferred polymeric film is polyester film, preferably polyethylene tetraphthalate (PET) which is about 25 microns in thickness. PET film 11 has a refractive index of between 1.63–1.67, generally about 1.65. The polyester film 11 is then optionally coated with a hard abrasion resistant coating 12. Details of the coating 12 and its method of application are described in U.S. Pat. No. 4,557,980 the contents of which are hereby incorporated into the present description by reference. The abrasion resistant coating 12 is a mixture of polymerisable monomers including triacrylate or a tetra acrylate and acrylic acid and photoinitiators, which is applied to the film by any suitable method, preferably by direct gravure, and polymerised by UV radiation to cure the acrylic coating. The coating 12 is about 4 $\mu$m (microns) in thickness and has a refractive index of about 1.52.

The PET film 11 and optionally the abrasion resistant layer 12 are in turn coated in anti-reflective layers 13. The anti-reflective layers 13 comprise a first inner high refractive index ceromer layer 14 about 80 nm thick containing metal oxide particles, and a second outer lower refractive index polymeric layer 15 about 90–100 nm thick. The outer layer 15 is exposed to the air and is formed from a fluorine containing polymer.

In the first polymeric layer 14 the metal oxide ceromer may be formed by an condensation reaction between a metal alkoxide and a polyester containing silane groups. The preferred metal oxides are Titanium and Zirconium Dioxides, more preferably Titanium Dioxide, formed from the gel reaction between titanium isopropoxide and a polymer having silane groups. Preferably the polymer is a polyester having silane groups, preferably at at least one end of the polymer chain. The preferred polyesters are Morton Adcote 89R3 and Morton Adcote 89R1 and are of the type described in U.S. Pat. No. 4,408,021, and its continuation-in-part U.S. Pat. No. 4,429,005.

The titanium isopropoxide and the silane functional polyester groups condense to form a $TiO_2$/polymer ceramer.

The refractive index of the first polymeric layer 14 (ceramer) is determined by the relative amounts of Titanium dioxide and polymer present. The higher refractive index values being given by greater proportions of Titanium Dioxide being present. However, the properties of the layer 14 are a compromise between having a high refractive index value and good flexibility, so that the layer 14 adheres to, and flexes with the PET film 11. The ratio of Titanium isopropoxide:silane modified polyester should be between 60:40 and 40:60 by weight respectively, preferably 50:50.

The sol-gel reaction mixture is dissolved in methyl ethyl ketone (MEK) to give an 8% solid solution which is coated on the film 11 or abrasive resistant coating 12 by reverse gravure printing using a 360 QCH gravure cylinder. The film passes through an oven at 180° C. with a residence time of 1 min to partially cure the sol-gel coating.

An 8% solid solution gave a coating about 50 nm in thickness (50×10$^{-9}$m). This thickness of coating may also be achieved by coating less concentrated solution and building up the coats before curing. This coating thickness is less than ¼ of wavelength.

Alternative silane substituted polymers may include polydimethyl siloxane, alkoxysilanes, and polyesters having silane groups partially substituted for the hydroxy groups.

It is advantageous to add a small percentage by weight of a silane coupling agent, preferably a carbodiimide functional silane (available from Zeneca) as a cross-linking agent for reaction with the metal alkoxide. This may help promote adhesion to the film 11 and reduce the likelihood of phase separation in the sol-gel. Preferably about 1–10%, or more preferably 4% by weight of carbodiimide are added to a 100 parts by weight mix of Titanium isopropoxide and silane modified polyester.

Example 1 relates to the preparation of a suitable ceramer Coating.

Example 1

Preparation of a 50:50 Ti(iPrO)$_4$:Adcote 89R3 Ceramer Solution 2.5 gms of titanium isopropoxide is taken into a polyproplene bottle, 2.5 gms of MEK is weighed into another bottle and 0.05 ml of 10N HCL is added. This acidic MEK is added to titanium isopropoxide slowly taking care to contain any exotherm present.

2.17 gms of Adcote 89R3 (original resin containing 32.9% solids) is taken and 3 gms of MEK are added to reduce its viscosity. This solution is added under rapid stirring to titanium solution slowly taking care to quench any exotherm present. When the addition is complete pH is adjusted to 2.5. The mixture is allowed to stir for 5 minutes. 2% crosslinking agent is added to the solution and stirred for a further 10 minute period. Then it is diluted further with MEK to give required concentration.

This solution now can be used to coat suitable substrates. The cured ceramer coatings have a high refractive index in the order of 1.69 to 1.71.

Alternatively, the first polymeric layer 14 may be formed from the same polymeric matrix as the optional abrasion resistant coating 12 with the further addition of particles of an iron oxide which have been reduced to an equivalent average, diameter size of less than 50 nm (m$^{-9}$). Suitable powdered iron oxide is available from Cookson Matthey Ceramics & Materials Ltd, England and sold under the references AC0575 and AC 1075. The preferred iron oxide is haematite (Fe$_2$O$_3$), that is the AC0575. The amount of iron oxide added to the coating will determine the refractive index of the coating. A layer 14 containing 35–40% by weight of iron oxide will have a refractive index of at least 1.69, and with loadings of greater than 50% it will be possible to raise the refractive index to at least 1.8, or higher as is desired.

The iron oxide is suspended in suitable solvent for the polymer, typically MEK, together with a dispersant e.g. Solsperse 24000 available from Zeneca. The mixture is thoroughly mixed in a ball mill to ensure an even dispersion of the particles in the solvent, and the suspension is then mixed with the polymer by mechanical mixing.

The final layer (14) may include 5–85% by weight of haematite, 1–13% by weight of surfactant, with the balance being the polymer matrix.

By controlling the amount of heamatite present in the polymer it is possible to produce a layer having a desired refractive index. For example 20–25% iron oxide content will produce a layer having a refractive index of at least 1.74.

Example 2 relates to the preparation of a red iron oxide dispersion and its mixing into the polymer coating.

Example 2

Preparation of transparent red iron oxide dispersion in methyl ethyl ketone:

By weight—40% transparent red iron oxide AC1075

6.4% Solsperse 24000 (dispersant ex Zeneca)

53.6% MEK

Mixed in a ball mill containing 1 mm Zirconia beads and rolled for 3 weeks.

Final dispersion mixed with MEK and hardcoat (layer 12) formulation (48% acrylic acid, 47% pentaerythritol triacrylate, 5% photoinitiator—Irgacure 184 ex Ciba Geigy) to give dispersion containing:

By weight—5% hardcoat formulation

5% transparent red iron oxide 0.8 % dispersant 89.2% MEK

The dispersion was coated into the substrate and cured using UV radiation to give a final coating containing approximately 18% by volume iron oxide.

The second outer polymeric layer 15 is a fluorine containing polymer which may be selected from among many well known and ready synthesisable fluorinated polymers. The refractive index typically decreases with increased fluorination. Fluorinated polymers having a respective refractive index of between 1.3–1.45 are preferred. Preferred fluorinated polymers may include a copolymer of vinylidene fluoride and tetrafluorethylene, copolymers of chlorotrifluoro ethylene and vinylidene fluoride, polyvinylidene fluoride, dehydrofluorinated polyvinylidene fluoride, copolymer of hexafluoropropylene and vinylidene fluoride, and fluorinated acrylics such as poly (1-l dihydropentadecafluorooctyl acrylate) or poly[(11 dihydropentadenefluorooctyl methacrylate) which have a refractive index of about 1.37–1.38 and other perfluoro polyesters containing acrylate end groups. Such material can be cured by exposure to ultra violet light.

The preferred fluorinated polymer is an acrylate modified low molecular weight perfluoro polyether. The low molecular perfluoropolyether is available from Ausimont (an Italian company) under the trade name Fluorlink β, which then undergoes further reaction resulting in, preferably 100%, substitution of acrylate groups for the isocyanate and hydroxyl groups.

Example 3 relates to the preparation of two suitable prefluoropolyether polymers.

Example 3

Synthesis of Acrylate Tipped Perfluoropolyether Polymers

Acrylate monomers are reacted with isocyanate terminated fluoropolymers using a suitable solvent at room temperature. When there is no residual isocyanate, the acrylated fluoropolymer is UV cured to give low refractive index hard coats in the order of 1.37 to 1.4.

Example 3a 0.00159 moles of Fluorolink B (Pomblin Z Disoc, supplied by Ausimont, Italy) is taken into a dry flask purged with nitrogen. The polymer is dissolved in hexafluoroxylene. Then an excess of hydroxybutylacrylate (0.003 moles) was added and the sum stirred at room temperature for a week. When there is no residual isocyanate, (confirmed by Infrared analysis), the clean, viscous solution was applied to the first layer 14 and cured.

Example 3(b)

0.0015 moles of Fluorolink B is taken into a clean dry flask and purged with nitrogen. The polymer was dissolved in hexafluoroxylene. When dissolved completely, an excess of pentaerythritol triacrylate is added to it and stirred at room temperature for a week. The reaction was continued until there was no isocyanate.

The triacrylate functionalised polymer was coated on to the first layer 14 and UV cured to give a hard low refractive index coating.

The fluorinated polymer may be applied as a solution of various solvents, in particular ketones, such as methylethyl ketone, methyl isobutyl ketone, methyl propyl ketone or mixtures thereof in concentrations of about 2–3%.

Fluorinated polymers may be used in blends, or mixtures, or alone. The proportions of the blends may vary depending upon the desired properties of the second layer 15, and the fluoropolymers may be mixed with a small percentage of polymethyl methacrylate (0–30%). Such materials are described in U.S. Pat. No. 3,925,081 and U.S. Pat. No. 4,046,457 the contents of which are hereby incorporated.

The fluoropolymer second layer 15 is coated onto the dried ceramer layer 14 by any suitable process, preferably by reverse gravure process to a thickness (when dried) of about 90 nm ($90 \times 10^{-9}$ m) which is about ¼ of wavelength. The presence of any groups in the first layer 14 may promote adhesion between the two layers 14 and 15.

Alternatively a suitable fluoropolymer may be evaporated under vacuum and deposited onto the first polymer layer, and subsequently cured by electron beam initiator techniques.

The film laminate will preferably comprise at least a polyester substrate having a refractive index of about 1.6, an inner of a polymeric film (14) containing metal oxide and having a refractive index of greater than 1.68 and preferably greater than 1.7, and a layer thickness of about ¼ wavelength, with a second polymeric layer (15) in contact with the first layer (14) to form an exposed outer layer and comprising a fluorinated polymer having a refractive index of 1.45 or less preferably no more than 1.4 and a thickness of about ¼ wavelength.

Figure 2:
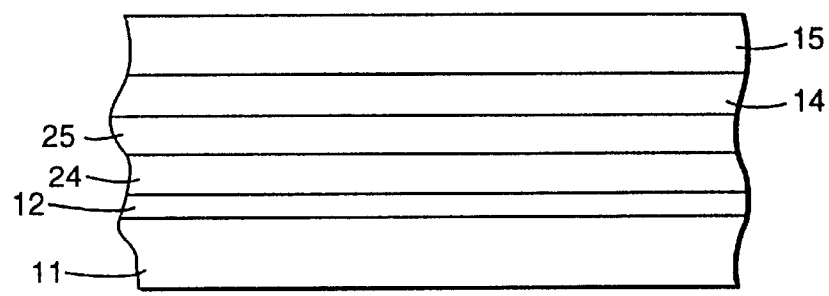
FIG. 2 is a schematic cross-sectional drawing of a second film laminate according to the invention.

In a further embodiment of the invention shown in FIG. 2 the polyester substrate 11 has the optional hard coat layer 12 adjacent thereto as described previously. The anti-reflective layers comprise as before the outer exposed polymeric lower refractive index layer 15 and the adjacent inner higher refractive index layer 14.

The laminate may further comprise function layers arranged between the hard coat (12) and the two outer layers (14) (15). The function layers may comprise a second pair of layers 24, 25 or alternatively may further include only one further additional layer (24) or (25). The layers (24) (25) may be optically active having a pre-determined refractive index, or other property such as colour to suit the end use of the film.

What is claimed is:

1. An anti-reflecting film comprising a transparent polymeric film substrate consisting of cellulose acetate, polyamide or polyester, wherein said polymeric film substrate is coated with at least two polymeric layers, the two polymeric layers being an exposed outer polymeric layer comprising a fluorine containing polymer and immediately adjacent thereto an inner organometallic polymeric layer comprising the condensation product of a metal alkoxide and a polymer reactive with the metal alkoxide.

2. Anti-reflective film as claimed in claim 3 wherein said inner polymeric layer comprises the reaction product of a metal alkoxide and a polymer having silane group therein.

3. Anti reflective film as claimed in claim 2 wherein the metal alkoxide is a titanium alkoxide.

4. An anti-reflective film comprising a transparent polymeric film substrate consisting of cellulose acetate, polyamide or polyester, wherein said polymeric film substrate is coated with at least two polymeric layers, the two polymeric layers being an exposed outer polymeric layer comprising a fluorine containing polymer and immediately adjacent thereto an inner organometallic polymer layer comprising the condensation product of a metal alkoxide and a polymer reactive with the metal alkoxide, wherein said inner polymeric layer comprises the reaction product of a metal alkoxide and a polymer having a silane group therein, wherein said polymeric film substrate is polyester, wherein the silane containing polymer is a silane modified polyester.

5. An anti-reflective film comprising a transparent polymeric film substrate consisting of cellulose acetate, polyamide or polyester, wherein said polymeric film substrate is coated with at least two polymeric layers, the two polymeric layers being an exposed outer polymeric layer comprising a fluorine containing polymer and immediately adjacent thereto an inner organometallic polymeric layer comprising the condensation product of a metal alkoxide and a polymer reactive with the metal alkoxide, wherein said polymeric film substrate is polyester, wherein the exposed outer polymeric layer is a crosslinked fluorine containing polymer.

6. An anti-reflective reflecting film comprising a transparent polymeric film substrate consisting of cellulose acetate, polyamide or polyester, wherein said polymeric film substrate is coated with at least two polymeric layers, the two polymeric layers being an exposed outer polymeric layer comprising a fluorine containing polymer and immediately adjacent thereto an inner organometallic polymeric layer comprising the condensation product of a metal alkoxide and a polymer reactive with the metal alkoxide, wherein said polymeric film substrate is polyester, wherein the exposed outer polymeric layer is an acrylate modified perfluoropolyether.

7. An anti-reflective reflecting film comprising a transparent polymeric film substrate consisting of cellulose acetate, polyamide or polyester, wherein said polymeric film substrate is coated with at least two polymeric layers, the two polymeric layers being an exposed outer polymeric layer comprising a fluorine containing polymer and immediately adjacent thereto an inner organometallic polymeric layer comprising the condensation product of a metal alkoxide and a polymer reactive with the metal alkoxide, wherein said polymeric film substrate is polyester, wherein the film further comprises at least one further optically active layer between the substrate and said inner layer.

8. An anti-reflective film comprising a transparent polymeric film substrate consisting of cellulose acetate, polyamide or polyester, wherein said polymeric film substrate is coated with at least two polymeric layers, the two polymeric layers being an exposed outer polymeric layer comprising a fluorine containing polymer and immediately adjacent thereto an inner organometallic polymeric layer comprising the condensation product of a metal alkoxide and a polymer reactive with the metal alkoxide, wherein said polymeric film substrate is polyester, wherein the film substrate has a hard abrasion resistant coating immediately adjacent the substrate.

9. An anti-reflective film comprising a transparent polymeric film substrate consisting of cellulose acetate, polyamide or polyester, wherein said polymeric film substrate is coated with at least two polymeric layers, the two polymeric layers being an exposed outer polymeric layer comprising a fluorine containing polymer and immediately adjacent thereto an inner organometallic polymeric layer comprising the condensation product of a metal alkoxide and a polymer reactive with the metal alkoxide, wherein said polymeric film substrate is polyester, wherein the inner polymer layer has a refractive index $\eta_2$ of at least 1.60 and a thickness of about $$\frac{550 \text{ nm}}{4\eta_2}$$

and the outer polymeric layer has a refractive index $\eta_1$ not greater than 1.45 and a thickness of about $$\frac{550 \text{ nm}}{4\eta_1}.$$

10. An anti-reflective film comprising a transparent polymeric film substrate consisting of cellulose acetate, polyamide or polyester, wherein said polymeric film substrate is coated with at least two polymeric layers, the two polymeric layers being an exposed outer polymeric layer comprising a fluorine containing polymer and immediately adjacent thereto an inner organometallic polymeric layer comprising the condensation product of a metal alkoxide and a polymer reactive with the metal alkoxide, wherein said inner polymeric layer comprises the reaction product of a metal alkoxide and a polymer having a silane group therein, wherein said polymeric film substrate is polyester, wherein the inner layer comprises as an additive a carbodiimide functional silane.

11. An anti-reflective film comprising a transparent polymeric film substrate, an exposed outer polymeric layer comprising fluoro-containing polymers having a refractive index $\eta_1$ not greater than 1.45 and a thickness of about $$\frac{550 \text{ nm}}{4\eta_1}$$

and an inner polymeric layer adjacent the exposed outer layer containing metal oxide and having a refractive index $\eta_2$ of at least about 1.6 and a thickness of about $$\frac{550 \text{ nm}}{4\eta_2}.$$

12. A multilayer anti-reflective film comprising a transparent polymeric film substrate and including as one of its layers a transparent polymeric layer containing inorganic powder particles having a refractive index greater than 2.6

13. A multilayer anti-reflective film comprising a transparent polymeric film substrate and including as one of its layers a transparent polymeric layer containing inorganic powder particles having a refractive index greater than 2.6, wherein the powder particles are coloured powders having an average equivalent diameter of less than 100 nm (100× $10^{-9}$m).

14. An anti-refractive film as claimed in claim 12, wherein the powder particles are metal compounds.

15. An anti-reflective film as claimed in claim 14, wherein the metal compound is preferably an iron oxide.

16. A multilayer anti-reflective film comprising a transparent polymeric film substrate and including as one of its layers a transparent coloured polymeric layer containing inorganic powdered particles which impart the coloration to said layer, and raise the refractive index of said layer to at least 1.6.

17. A multilayer antireflective film comprising a transparent polymeric film substrate and including as one of its layers a transparent colored polymeric layer containing inorganic powdered particles which impart the coloration to said layer, and raise the refractive index of said layer to at least 1.6, wherein the coloration of the transparent coloured polymeric layer is neutralised by including a suitable dye in the polymeric film substrate, or other layer of said layers.

18. A multilayer antireflection film as claimed in claim 1, wherein said polymeric film substrate is polyester.

19. A multilayer antireflection film as claimed in claim 1, wherein said polymeric film substrate is polyethylene terephthalate.

* * * * *

UNITED STATES PATENT AND TRADEMARK OFFICE
CERTIFICATE OF CORRECTION

PATENT NO. : 6,245,428 B1
DATED : June 12, 2001
INVENTOR(S) : Port et al.

Page 1 of 1

It is certified that error appears in the above-identified patent and that said Letters Patent is hereby corrected as shown below:

Column 1,
Line 10, "effected" should read -- affected --; and "glass" should read -- glare --.

Column 4,
Line 34, "ceromer" should read -- ceramer --.

Column 6,
Line 49, "Fluorlink" should read -- Fluorolink --.

Signed and Sealed this

Twenty-fifth Day of December, 2001

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO.    : 6,245,428 B1
DATED         : June 12, 2001
INVENTOR(S)   : Port et al.

It is certified that error appears in the above-identified patent and that said Letters Patent is hereby corrected as shown below:

<u>Column 8,</u>
Line 8, "claim 3" should read -- claim 18 --.

Signed and Sealed this

Sixteenth Day of July, 2002

*Attest:*

*Attesting Officer*

JAMES E. ROGAN
*Director of the United States Patent and Trademark Office*